(12) United States Patent
O'Leary (10) Patent No.: US 8,977,973 B2
(45) Date of Patent: Mar. 10, 2015

(54) ONLINE LOGO TOOL

(75) Inventor: Timothy O'Leary, Navan (IE)

(73) Assignee: Ebay Inc., San Jose, CA (US)

( * ) Notice: Subject to any disclaimer, the term of this patent is extended or adjusted under 35 U.S.C. 154(b) by 387 days.

(21) Appl. No.: 12/953,305

(22) Filed: Nov. 23, 2010

(65) Prior Publication Data

US 2012/0131486 A1 May 24, 2012

(51) Int. Cl.
*G06F 3/0481* (2013.01)
*G06Q 10/10* (2012.01)

(52) U.S. Cl.
CPC ...................................... *G06Q 10/10* (2013.01)
USPC ......................................................... 715/765

(58) Field of Classification Search
USPC ............................... 715/770; 709/203; 705/26
See application file for complete search history.

(56) References Cited

U.S. PATENT DOCUMENTS

| | | | | |
|---|---|---|---|---|
| 5,610,839 A * | 3/1997 | Karolak et al. | | 455/450 |
| 5,630,070 A * | 5/1997 | Dietrich et al. | | 705/7.23 |
| 5,819,092 A * | 10/1998 | Ferguson et al. | | 717/113 |
| 7,124,101 B1 * | 10/2006 | Mikurak | | 705/35 |
| 8,015,173 B2 * | 9/2011 | Chipalkatti et al. | | 707/708 |
| 8,209,611 B2 * | 6/2012 | Yoshimine | | 715/723 |
| 8,320,025 B2 * | 11/2012 | Jackson et al. | | 358/453 |
| 2002/0038256 A1 * | 3/2002 | Nguyen | | 705/26 |
| 2003/0120550 A1 * | 6/2003 | Peyrelevade et al. | | 705/26 |
| 2004/0172268 A1 * | 9/2004 | Franklin et al. | | 705/1 |
| 2005/0114229 A1 * | 5/2005 | Ackley et al. | | 705/26 |
| 2005/0246627 A1 * | 11/2005 | Sayed | | 715/513 |
| 2006/0048063 A1 * | 3/2006 | Stackowicz et al. | | 715/764 |
| 2007/0233573 A1 * | 10/2007 | Wang et al. | | 705/26 |
| 2008/0281722 A1 * | 11/2008 | Balasubramanian et al. | | 705/26 |
| 2009/0024697 A1 * | 1/2009 | Melet et al. | | 709/203 |
| 2010/0076863 A1 * | 3/2010 | Golomb | | 705/27 |

* cited by examiner

*Primary Examiner* — Phenuel Salomon
(74) *Attorney, Agent, or Firm* — Haynes and Boone LLP (57) ABSTRACT

An online tool allows a user, such as an online merchant, to access a page of a service provider, select a format, customize funding sources and designs, and copy and paste the code to the merchant page to quickly and easily create a customized funding source graphic.

14 Claims, 12 Drawing Sheets

ONLINE LOGO TOOL

BACKGROUND

1. Field of the Invention

The present invention generally relates to webpage creation and more particularly to a tool for customizing logos on a webpage.

2. Related Art

Online transaction are becoming more and more prevalent, with an ever-increasing number of online merchants and online payment mechanisms. The increase is due partly to the ease of making a purchase online instead of physically at a store. An online merchant may offer a user or consumer various options for payment, which gives the consumer more flexibility to choose a desired funding source, as well as giving the merchant a better chance that one of the offered funding sources will be acceptable by the consumer. Thus, typically, an online merchant provides the consumer with multiple funding sources.

These funding sources may include different types of credit cards, e.g., Visa, American Express, or MasterCard, bank payments, or different payment providers, such as PayPal, Inc. of San Jose, Calif. The funding sources are typically placed on the merchant website, so that the consumer can easily identify the available funding sources. Ease of identification is due, in part, to distinctive looks of the various funding sources.

However, because of these different looks, a collection of the available funding sources may not be aesthetically pleasing or complement the look of the merchant site.

In addition, the merchant may offer its products or services throughout the world, with specific products/services for specific geographic locations. As a result, funding sources may not be the same between different regions. For example, a payment source common in Mexico may not be available for use in Germany. Thus, the merchant would want to offer that funding source to customers in Mexico, but not to customers in Germany.

The above may require the merchant to create specific graphics and/or templates to present funding sources that the merchant wants. This can be time-consuming, tedious, and costly. As a result, a merchant may decide to forego one or more possible funding sources.

Thus, it is desirable to provide a tool for online merchants to quickly and easily create a funding source portion on their web site that overcomes the above disadvantages.

SUMMARY

According to one embodiment, an online merchant accesses a page of a payment provider, customizes funding sources and designs, and copies and pastes the code to the merchant page to quickly and easily create a customized funding source graphic.

In one embodiment, the merchant first accesses the appropriate page on a payment provider site. The merchant then sees one or more different formats for displaying the payment options. The different formats can be the same for each merchant, i.e., standardized formats, or the formats can be merchant specific, such as the payment provider using a screen scrape or other means to determine the size, colors, etc. of the merchant site, as well as the size, location, colors, etc. of the payment options portion of the merchant site.

The merchant selects the desired format and can then begin to customize the display. Next, the merchant is able to see possible funding sources, such as in logo format. Desired funding sources can then be selected, such as a simple drag and drop into a field or box. The order or placement of the funding sources within the box can also be selected by the merchant. Additional information about the funding sources can be seen, such as by moving a mouse over a particular funding source. This additional information may include what countries the funding source is available for use.

Once the desired funding sources are selected, the merchant can choose a desired color scheme. This can be done in different ways. For example, the merchant can select a desired color palette or color scheme first, which shows the selected color palette on the screen. The merchant can then move a mouse or selector within the color palette to select the desired color for the funding source display.

The merchant may preview the display on the merchant site if desired. If so, the merchant can enter the website address into a field and submit the address, which recreates the merchant webpage, but with the payment option display on the webpage. The merchant can then drag the display anywhere on the merchant page. If the merchant wants to change the color scheme, this can be done directly on the page. Once satisfied, the merchant is directed back to a page showing code (e.g., HTML) for the payment display.

The merchant can copy and paste the code onto the merchant site to quickly and easily display the customized display. If the merchant does not need to see the display on the merchant page, the merchant can go directly to the code page to copy and paste.

As a result, the merchant can quickly and easily create any number of different displays, both in color, style, and payment options, for use on different pages of a merchant site.

These and other features and advantages of the present disclosure will be more readily apparent from the detailed description of the embodiments set forth below taken in conjunction with the accompanying drawings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Figure 1:
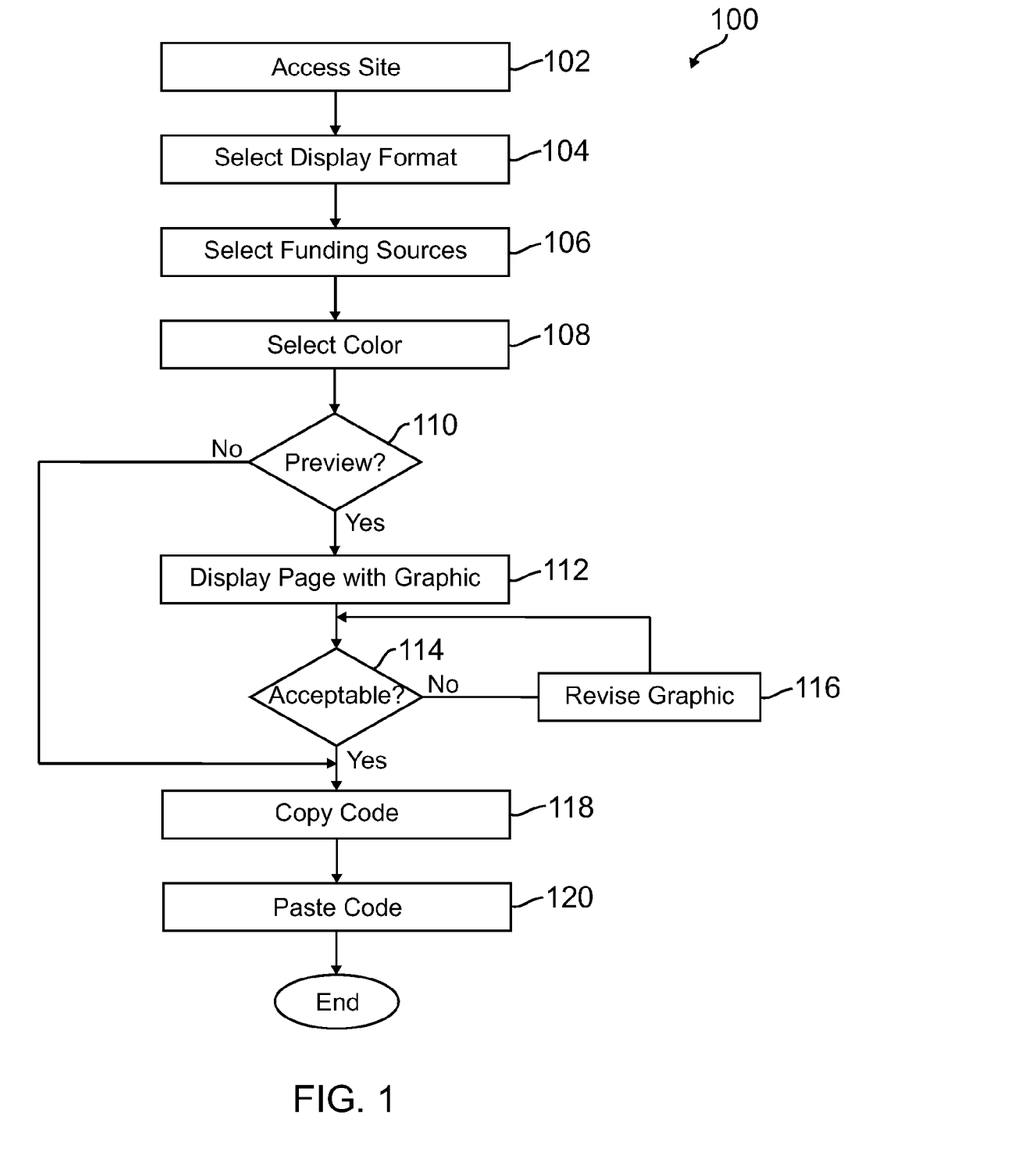
FIG. 1 shows a flowchart for a merchant to create a customized display through an online site, according to one embodiment.

FIG. 1 shows a flowchart 100 for a merchant to create a customized display through an online site, according to one embodiment. In one example, the online site is managed by a payment provider, such as PayPal, Inc. of San Jose, Calif. At step 102, a merchant or user desiring to create a display accesses the online site. This can be through a device, such as a PC, laptop, iPad from Apple, or other computing/communication device. Communication can be through the Internet using various protocols. Once on the site, the merchant can see one or more different formats for displaying payment options or funding sources.

In one example, one format is a single row of funding sources, another format is single column of funding sources, and a third format is two columns of funding sources. The merchant may be presented with only one format or many different ones. In one embodiment, the same standard formats are presented to all merchants or users. In another embodiment, the formats are still standard, but differ depending on characteristics of the merchant, such as size, status with the payment provider, etc.

In still another embodiment, the format types presented may be merchant specific. For example, the payment provider may scrape information about the merchant site from the Internet or obtain information about the merchant site by other means. Such information may include the size, colors, etc. of the merchant site, as well as the size, location, colors, etc. of the payment options portion of the merchant site. Using this information, the payment provider can present options that better fit the look and feel of the specific merchant site.

Next, at step 104, the merchant selects the desired format from the presented options. This can be accomplished by clicking or selected a link or button associated with the desired format. The selection is conveyed to the payment provider, who then provides the merchant with a screen to select specific funding sources or payment options. In one embodiment, the types of funding sources are independent of the merchant. In another embodiment, the funding sources are dependent, such as the size of the merchant, the country of origin of the merchant, etc. Examples of funding sources include, but are not limited to, different credit cards, debit cards, and payment providers. More specific examples include Visa, MasterCard, American Express, Discover, PayPal, BillMeLater, Switch, Maestro, DirectDebit, 3V, and 4etoiles. The funding sources may be shown in logo format or other representations, which may make it easier for the merchant to see the different funding sources because these may have very distinctive and well-recognized looks.

In addition, the merchant may want additional information about the various funding sources. This can also be provided using the tool. For example, if the merchant moves a mouse or other means over a specific funding source, information about the funding source appears, such as countries in which the funding source is accepted. Other information may include the percentage of people having or using the funding source in each country. For even more specific information, the merchant may be provided with usage information of the funding source for purchases made with this particular merchant. Such information may allow the merchant to better select which funding sources to select as payment options for the merchant's site.

At step 106, the merchant selects the desired funding sources. In one embodiment, the merchant drags and drops desired funding sources into a field or box. In another embodiment, the merchant clicks, taps, or double-clicks on a funding source, which places that funding source into a field or box. The box may be the same shape for all format, such as a generic rectangular box, or the box may be based on the selected format. For example, if the selected format is a square or circular shaped grouping of funding options, the box may be square or circular shaped. The merchant may also determine the priority or order given to the funding options, such that the funding sources are shown in the order selected or the user can place the funding sources in specific positions relative to other selected funding sources. The merchant may also be given the option of changing the selected funding sources, such as making one larger or smaller than others.

Once the desired funding sources are selected, the merchant continues to step 108, where the merchant chooses a desired color scheme for the display. The selected funding sources and the selected format can be shown at this step. The default display may be white or another color, independent of the merchant. In another embodiment, the default color scheme for the display may be particular to the merchant, such as based on information about the merchant site. If the merchant wants the default color, the merchant may move to the next step. However, if the merchant wants to change the default or otherwise customize the color scheme, the merchant can easily do this on the page.

In one embodiment, the merchant is presented with one or more color palettes. For example, one color palette may show the spectrum of colors available. The merchant can then select a range of colors, e.g., more blue, more orange, more green, etc. This can be done by selecting the desired portion of the first color palette, such as with a slide tool or by clicking on an area. The selected color region may then be expanded into a second color palette that gives the merchant the opportunity to further refine the color scheme. This can be done by moving a mouse or other selector to a desired portion within this second color palette. Wherever the selection means is placed, the color changes, so that the merchant can see how each color looks with the previously selected format and funding sources. The selected color may be displayed over the entire display or in some other design. The merchant may also select different color schemes for different portions of the display.

Next, at step 110, the merchant determines whether to proceed with creating the display or previewing the display on the merchant site. If the latter, the merchant selects that option, which presents the merchant with appropriate instructions if needed. In one embodiment, the merchant is asked to enter and submit a URL address of the merchant website. If the payment provider already knows the merchant website address, this step may be omitted.

The merchant website is then displayed for the merchant, at step 112, along with the just-created display or graphic. In one embodiment, the merchant may move the graphic throughout the web page. This enables the merchant to better visualize how the display will look on the site.

A determination is then made at step 114 whether the display is acceptable. For example, the merchant, after seeing the color scheme on the actual site, may want to change the color scheme of the display and/or select a different display format for the payment options. If so, the merchant may revise the display, such as on the merchant page. This can be done in any number of ways. In one embodiment, the merchant double-clicks on the display, which then displays to the user editing tools. The editing tools can be the color palette as shown previously, sizing tools, and/or available formats.

The merchant then revises the display at step 116. Once completed and acceptable, the merchant is presented with code for creating the display or graphic, such as in HTML code. The merchant may still be given the option of revising the display, which the merchant may see on this page.

The merchant can then copy the code at step 118 and paste the code into the merchant's website code at step 120. Thus, the merchant can quickly and easily create and display the customized display on the website. The payment provider offering this tool can have its logo as part of the display, such that the payment provider is assured a certain branding on the merchant site.

FIGS. 2A to 2I are exemplary screen shots a user or merchant may see during a process for creating a customized display or graphic.

Figure 2A:
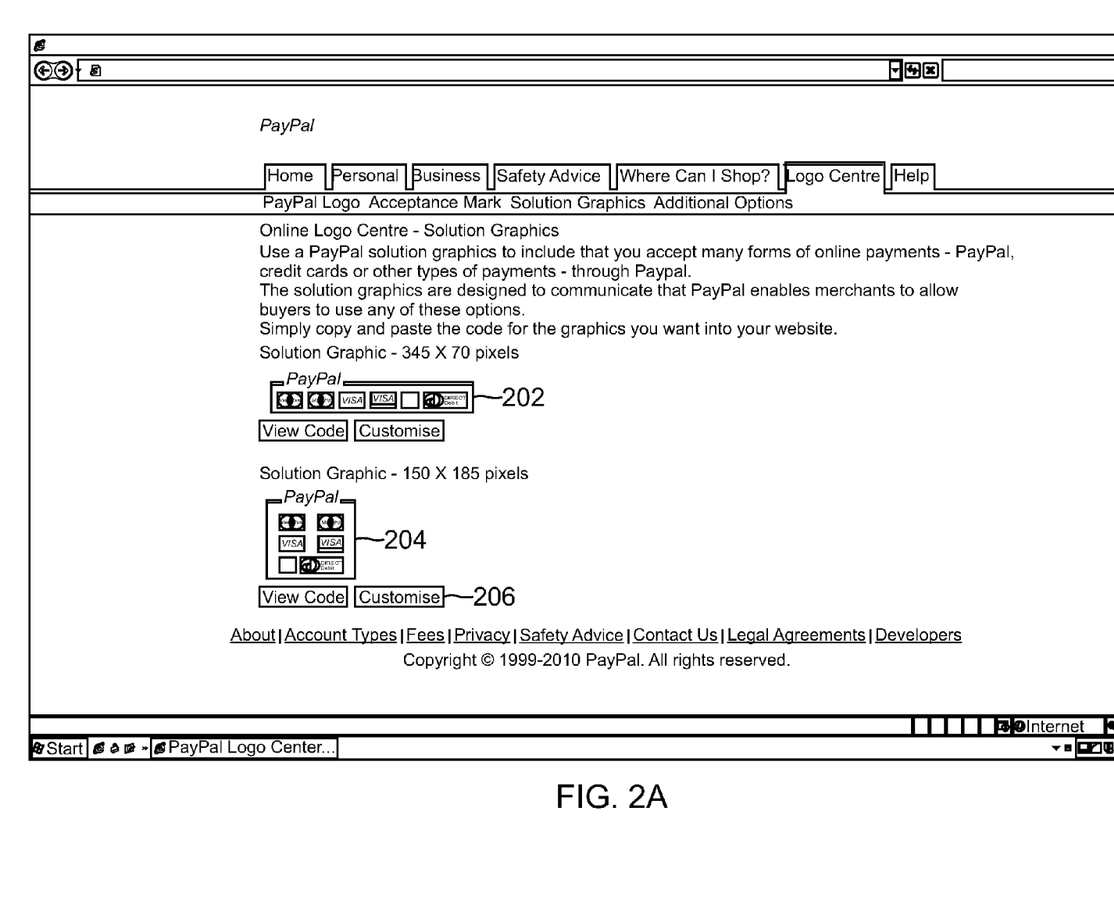
FIGS. 2A to 2I are exemplary screen shots a user or merchant may see during a process for creating a customized display or graphic.

FIG. 2A shows two format types for the merchant to select from, a single line display 202 and a two column display 204. This page is shown when the merchant first access the provider page, here PayPal, Inc., for creating the display (or logo as designated in this example). Funding sources shown on this page are simply examples to give the merchant a better visual representation of what the formats may end up looking like. In this example, the merchant selects two column display 204 by selecting a customize button 206 associated with two column display 204.

Figure 2B:
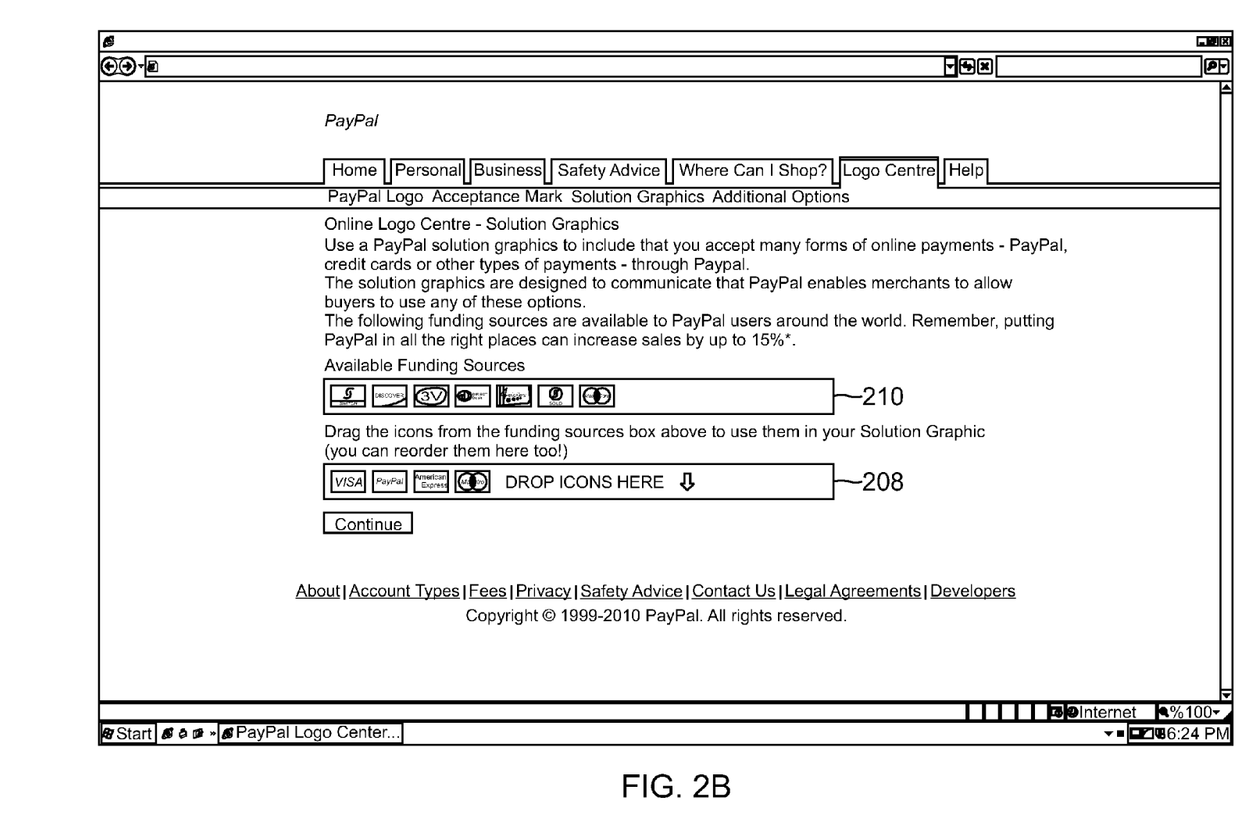

The merchant is then presented with the screenshot of FIG. 2B, although without any funding sources in a box 208. Initially, only available funding sources are shown in a box 210. As seen, the funding sources are shown as logos. Not shown is that the merchant can move a mouse over a specific funding source to show additional information about that funding source, such as countries available for use. Desired funding sources are then moved into box 208, such as dragging and dropping specific funding sources into box 208. As shown, four funding sources are selected and in a specific order, with Visa first, PayPal second, American Express third, and Maestro fourth. The merchant may also re-order the selected funding sources within box 208 or move funding sources back to box 210 to de-select that source.

Figure 2C:
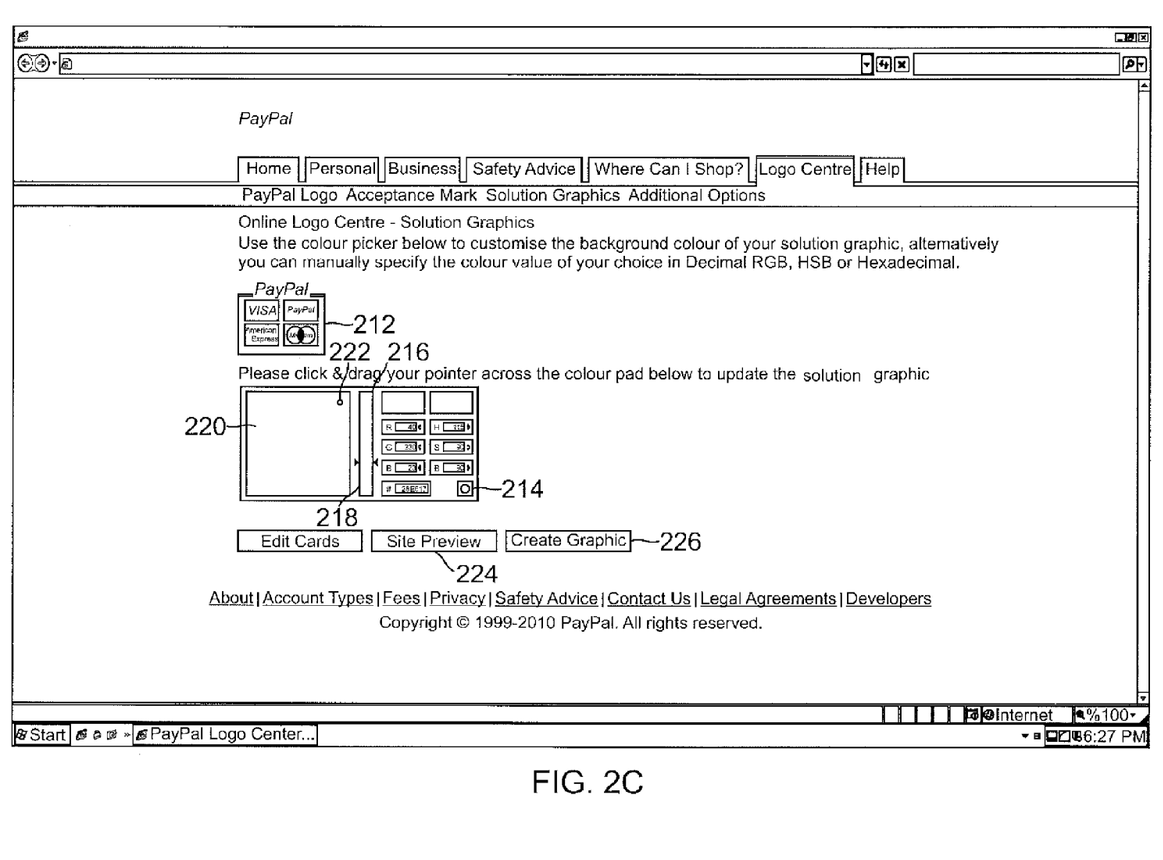

Once the merchant is satisfied with the funding sources, the merchant selects the continue button to proceed to the next step, shown in FIG. 2C. FIG. 2C allows the merchant to choose a desired color scheme. FIG. 2C shows the a sample current display 212, with the selected four payment sources and a color background. Below sample current display 212 is a color palette 214. Color palette 212 includes a vertical color bar 216. The merchant can move arrows 218 along color bar 216 to select a color range. The color range indicated by arrows 218 is shown in a display 220. Within display 220, the merchant can select a more specific color within the color range, such as moving a selector 222. The selected color is shown as the color background in sample current display 212. Thus, the merchant can see various colors on display 212 as the merchant moves along color bar 216 or display 220.

Once the merchant has decided on a particular color, the merchant may preview the display on the merchant site or go ahead and create the display. For the former, the merchant selects a site preview button 224, and for the latter, the merchant selects a create graphic button 226.

Figure 2D:
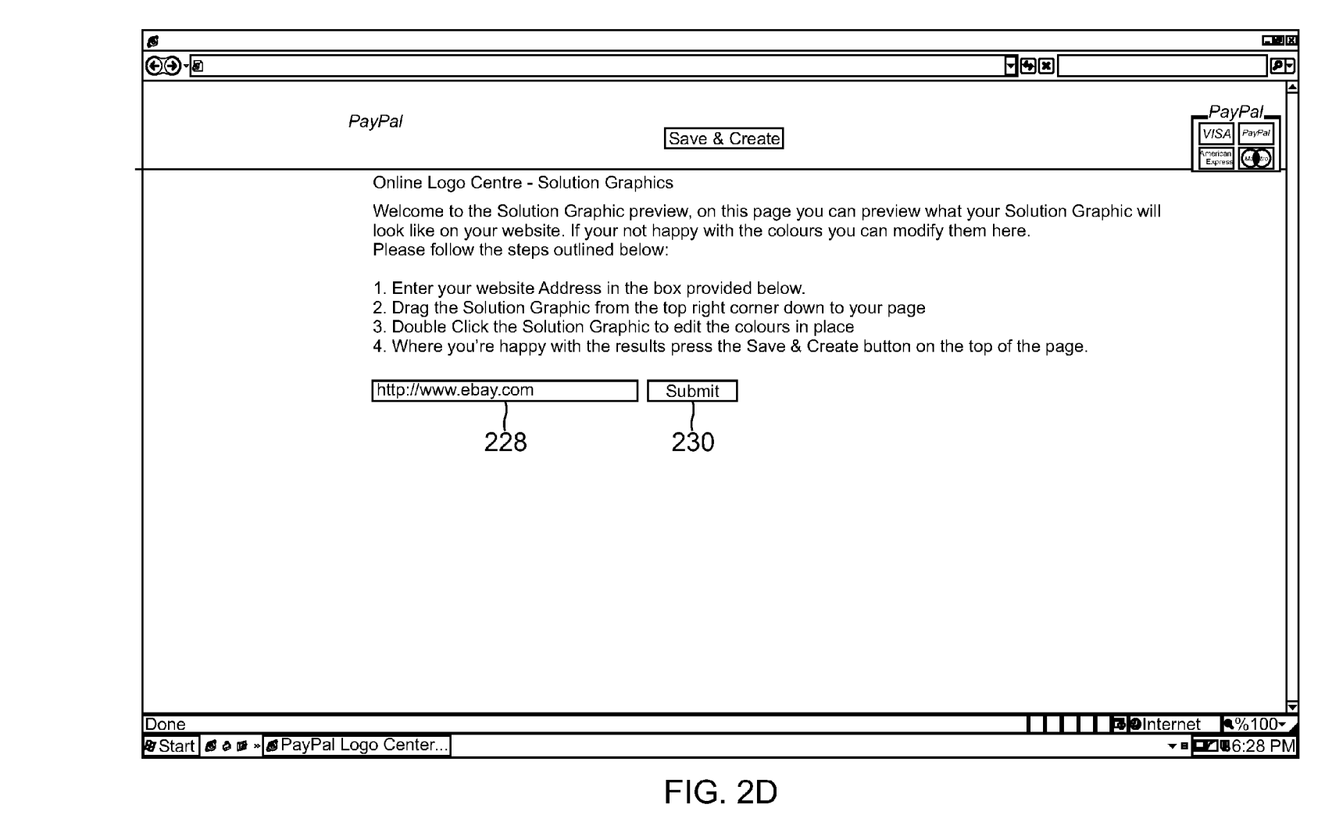

FIGS. 2D-2H are exemplary screenshots when the merchant selects site preview button 224, according to one embodiment. In FIG. 2D, the merchant can enter the URL address in a field 228 for the merchant website or other website in which the display is to be shown. After the merchant types in the address, the merchant submits the request, such as by selecting a submit button 230.

Figure 2E:
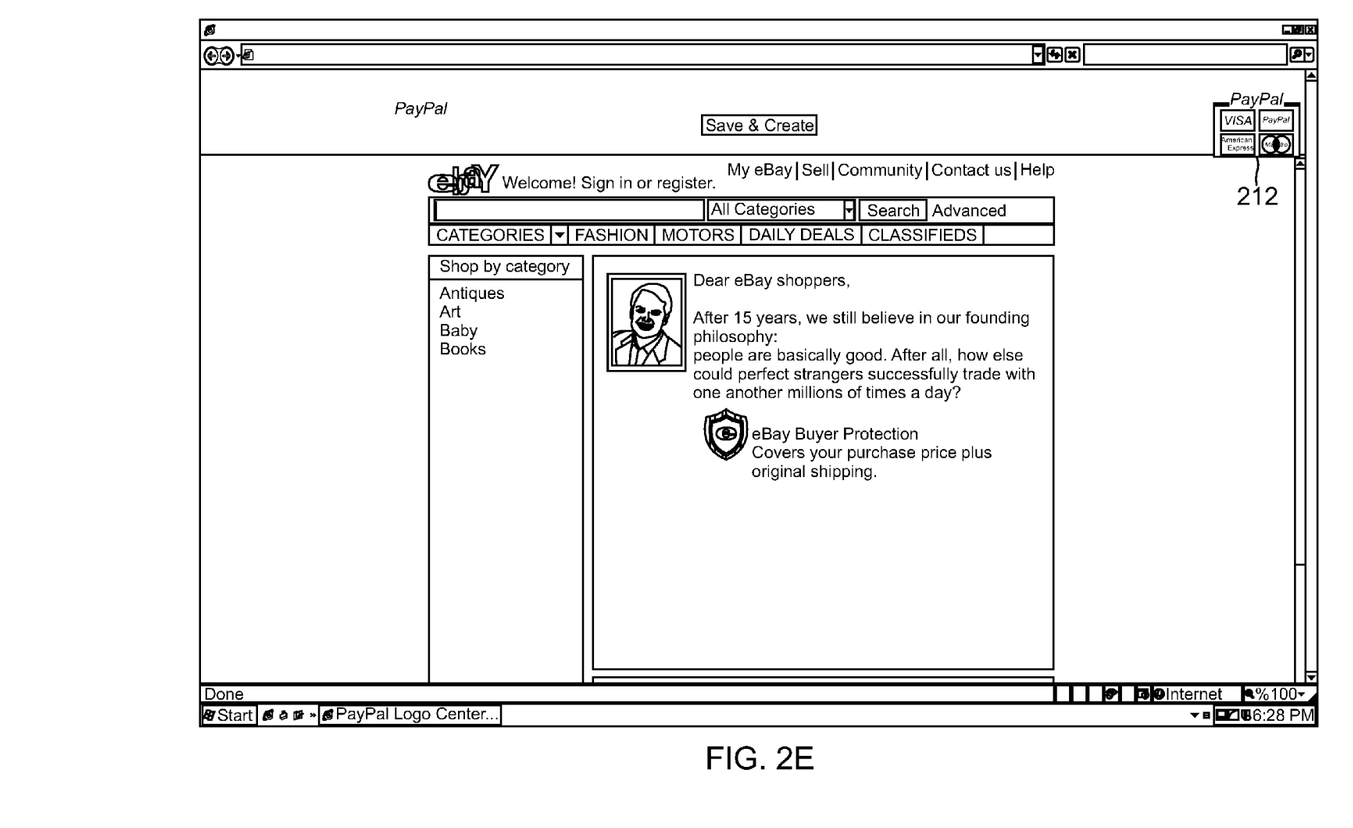
Figure 2F:
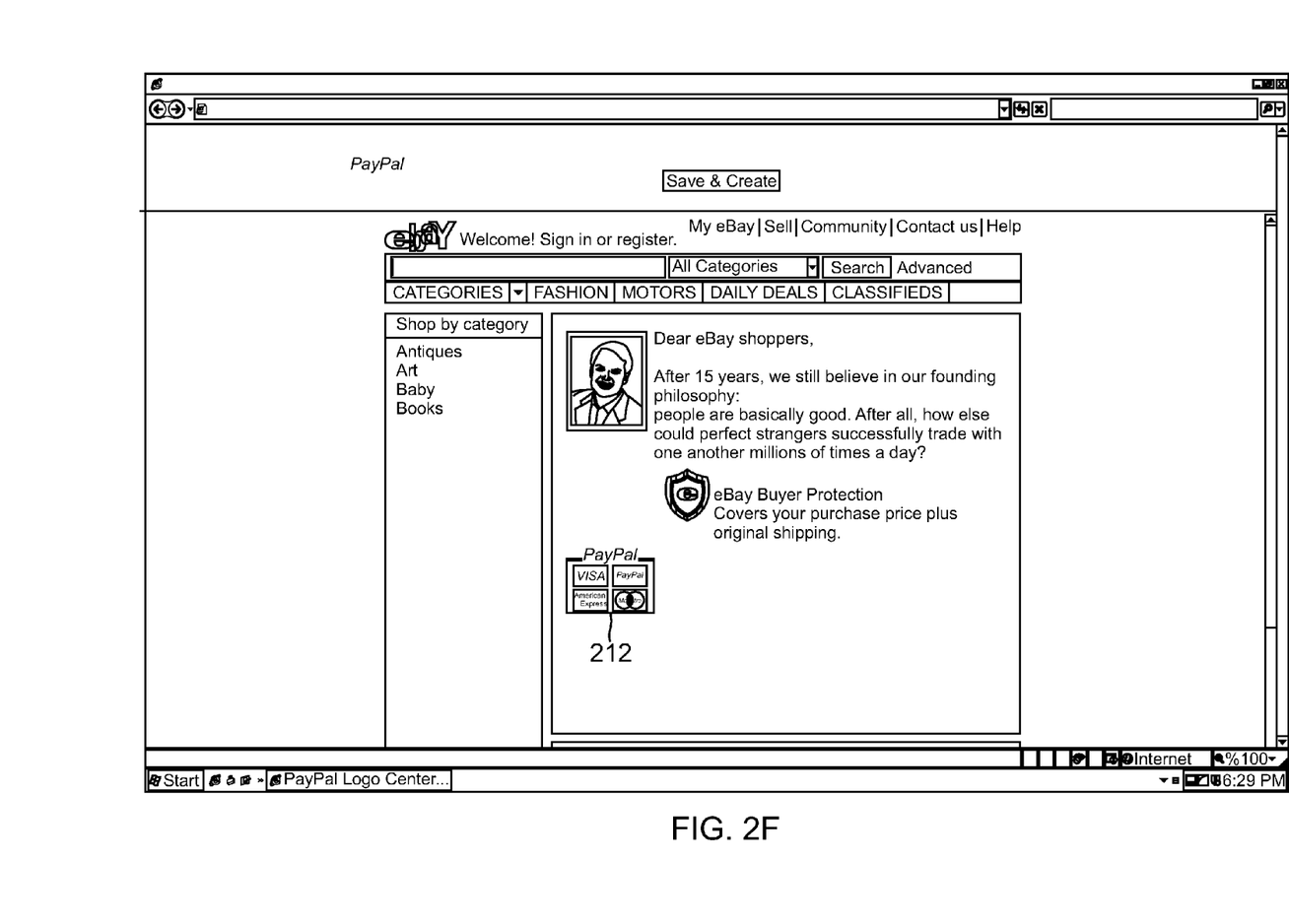

The merchant then sees the entered webpage, along with sample current display 212, as shown in FIG. 2E. The merchant can then move display 212 to different areas of the webpage, such as by dragging and dropping display 212. This will allow the merchant to see the display in a realistic context. FIG. 2F shows display 212 moved into the body of the website.

Figure 2G:
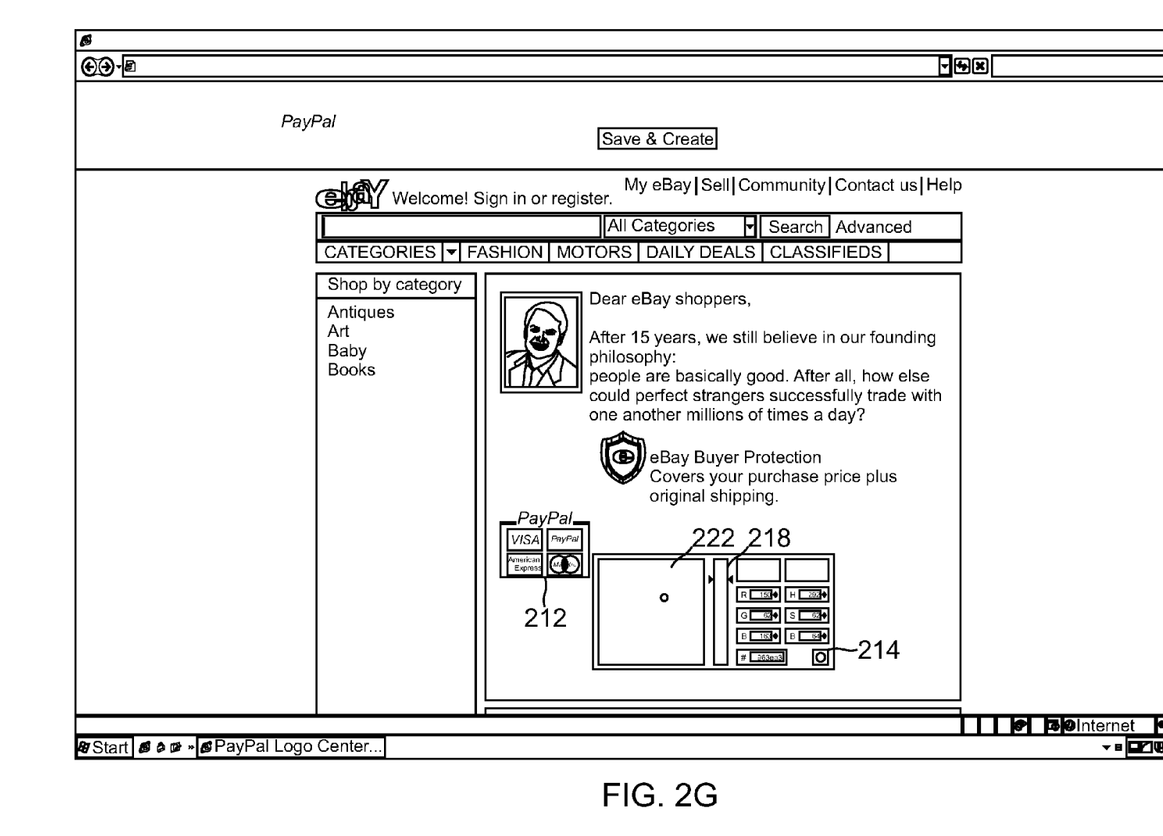

Once display 212 is moved into a desired position, the merchant can change the color scheme on the site. FIG. 2G shows color palette 214 overlayed on the website, such as when the merchant double-clicks on display 212 or other means. The merchant can then change the color using the color palette, where each time either arrows 218 or selector 222 is moved, the color in display 212 is changed. Other means may also be suitable to change the color. For example, an "eyedropper" type tool can be used to select a color directly from the webpage and to use that selected color in the display. This allows the merchant to select the exact color desired from the webpage instead of trying to match a color from a color palette.

Figure 2H:
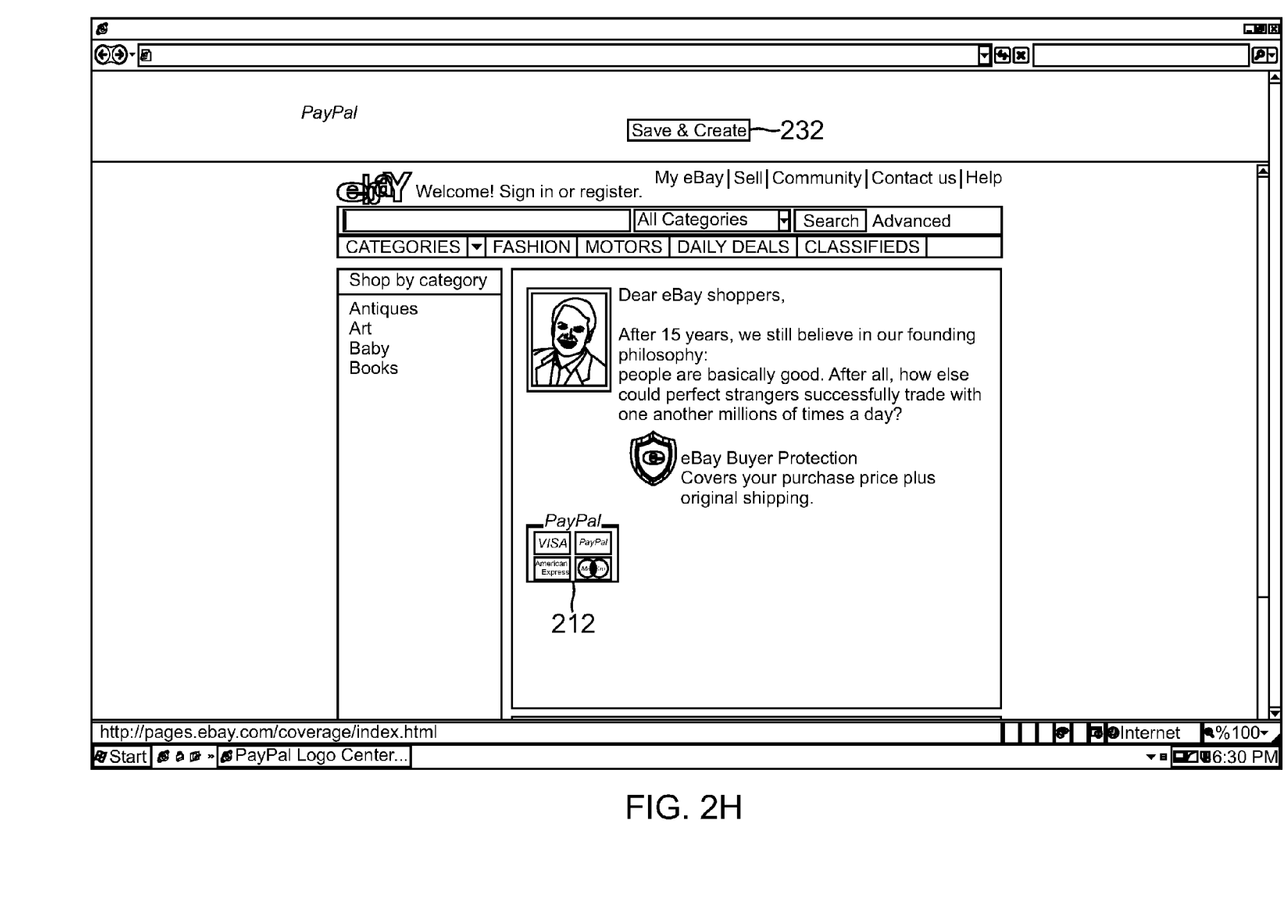

FIG. 2H shows the website with a new color scheme for display 212. Color palette has been removed, such as by clicking on display 212. If the merchant is satisfied with the created display, the merchant may select a "save and create" button 232 or other similar type button or link.

Figure 2I:
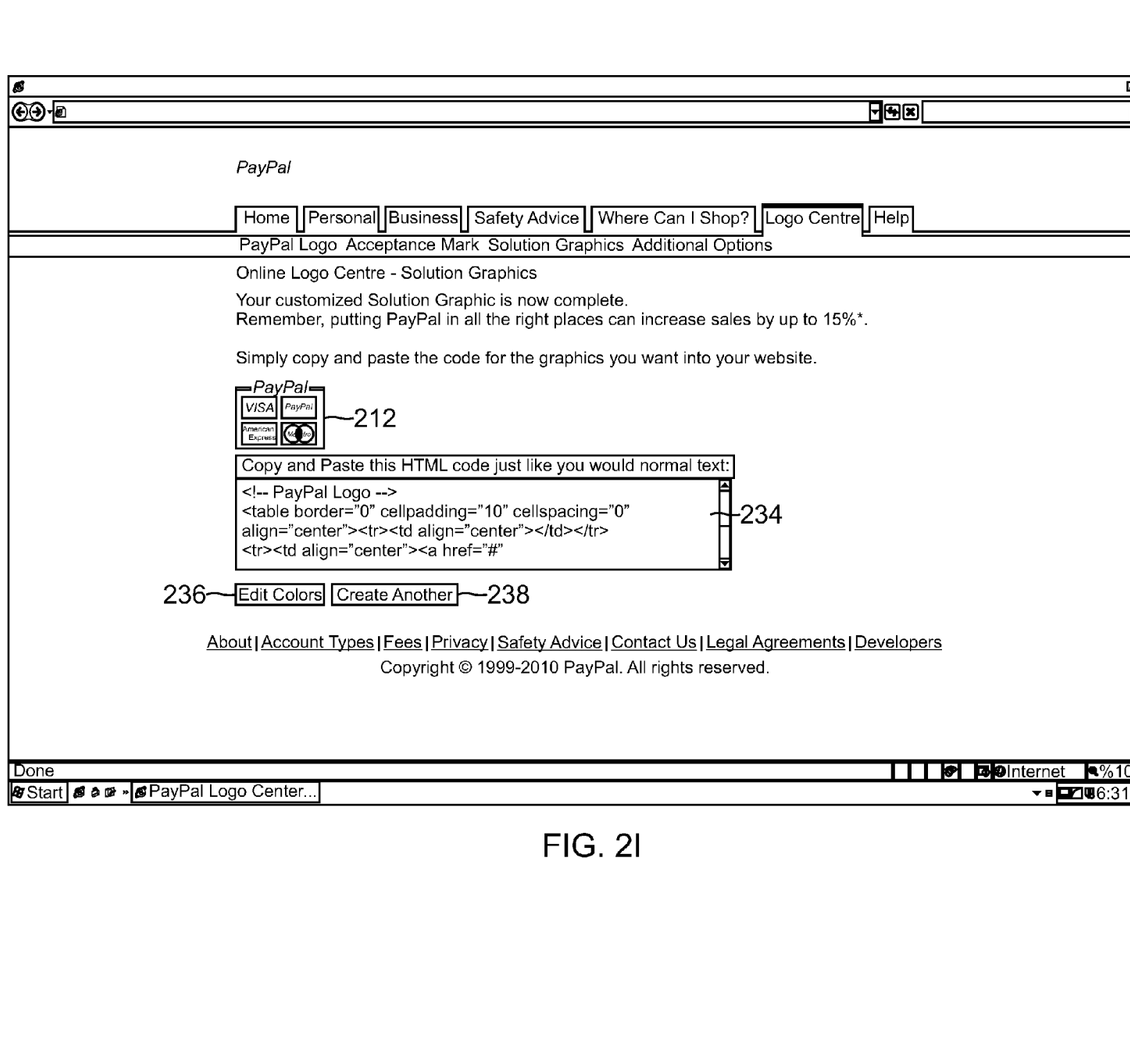

This takes the merchant to a screen shown in FIG. 2I. FIG. 2I may also be seen when the merchant selects create graphic button 226 from FIG. 2C. In FIG. 2I, display 212 is shown, along with a code listing 234. Code listing 232 is shown in HTML code, but other code formats may also be suitable. The merchant can simply copy and paste code listing 234 to create display 212 on the merchant site. This page also allows the merchant to edit colors or create another display, such as for use in a different country, by selecting appropriate buttons 236 and 238, respectively.

Figure 3:
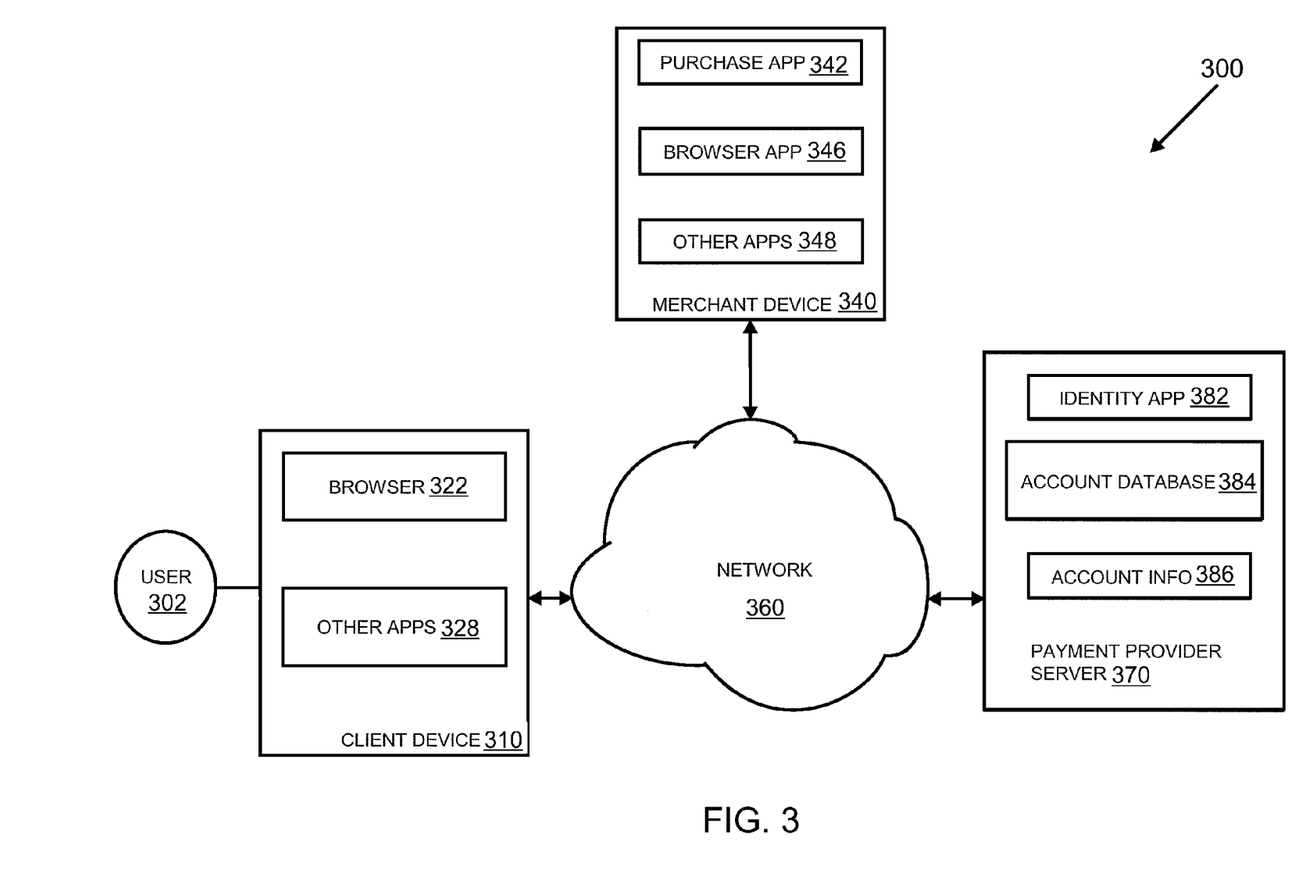
FIG. 3 is a block diagram of a networked system used in used in a display creation process according to an embodiment of the invention.

FIG. 3 is a block diagram of a networked system 300 used in used in a display creation process, such as described above, according to an embodiment of the invention. System 300 includes a client device 310, a merchant device 340, and a payment service provider server 370 in communication over a network 360. Payment service provider server 370 may be maintained by a payment provider, such as PayPal, Inc. of San Jose, Calif. Server 370 may be maintained by other service providers in different embodiments.

Network 360, in one embodiment, may be implemented as a single network or a combination of multiple networks. For example, in various embodiments, network 360 may include the Internet and/or one or more intranets, landline networks, wireless networks, and/or other appropriate types of communication networks. In another example, the network may comprise a wireless telecommunications network (e.g., cellular phone network) adapted to communicate with other communication networks, such as the Internet.

Client device 310, in one embodiment, may be implemented using any appropriate combination of hardware and/or software configured for wired and/or wireless communication over network 360. For example, client device 310 may be implemented as a personal computer of a user 302 (e.g., a client or customer) in communication with network 360. In other examples, client device 310 may be implemented as a wireless telephone (e.g., cell phone), personal digital assistant (PDA), notebook computer, and/or various other generally known types of wired and/or wireless computing devices. It should be appreciated that, in various embodiments, client device 310 may be referred to as a user device or a customer/client device without departing from the scope of the present disclosure.

Client device 310, in one embodiment, may include one or more browser applications 322 which may be used to provide a user interface to permit user 302 to browse information available over network 360. For example, browser application 322 may be implemented as a web browser to view information available over network 360, such as the online tool for creating a display described above. In one implementation, browser application 322 comprises a software program, such as a graphical user interface (GUI), executable by a processor that is configured to interface and communicate with the one or more merchant devices 340 and payment provider server 370 via network 360. For example, user 302 is able to access merchant websites to view such sites for display creation and placement. User 302, through client device 310, may also communicate with payment provider server 370 to create an account as described herein.

As such, client device 310, in one embodiment, may include other applications 328 as may be desired in one or more embodiments to provide additional features available to user 302, including creating an online logo or display with payment provider server 370. For example, applications 328 may include interfaces and communication protocols that allow the user to receive and transmit information through online sites. Applications 328 may also include security applications for implementing client-side security features, programmatic client applications for interfacing with appropriate application programming interfaces (APIs) over network 360 or various other types of generally known programs and/or applications.

Merchant device 340, which can be similar to client device 310, may be maintained by one or more service providers (e.g., merchant sites, auction site, marketplaces, social networking sites, etc.) offering various items, such as products and/or services, through their websites. Merchant device 340 may be in communication with a merchant server capable of handling various on-line transactions. The merchant (which could be any representative or employee of the merchant) can create a payment display with the payment provider in order to receive payments from consumers making purchases through the merchant site. Merchant device 340 may include purchase application 342 for offering products/services for purchase.

Merchant device 340, in one embodiment, may include a browser application 346 and other applications 348, similar to browser application 322 and applications 328 in client device 310. Browser application 346 and applications 348 enable the merchant to access a payment provider web site and communicate with payment provider server 370, such as to convey and receive information to create a payment display through the payment provider. As described in greater detail herein, embodiments of the present disclosure provide a way for the merchant to quickly and easily create customized payment or other displays for the website by communicating with payment provider server 370.

Payment provider server 370, in one embodiment, may be maintained by an online payment provider, which may provide processing for online financial and information transactions on behalf of user 302 with a merchant. Payment provider server 370 may include at least one identity application 382, which may be adapted to interact with the client device 310 and/or merchant device 340 over network 360 to facilitate the purchase of items, products and/or services by user 302.

Payment provider server 370, in one embodiment, may be configured to maintain a plurality of user and merchant accounts in an account database 384, each of which may include or be separate from an account information 386 associated with individual users, including user 302, and one or more merchants or sellers associated with one or more merchant devices 340. For example, account information 386 may include identity information of user 302 and merchants, such as one or more full names, business names, street addresses, email addresses and phone numbers, website addresses, or other types of financial information, which may be used to facilitate online transactions between user 302 and merchants. As such, identity application 382 may be configured to interact with a merchant server, user, or other payee to process, obtain, and store information for creating a display and other tasks. Identity application 382 may also store completed display for different merchant sites created by the merchant.

In one implementation, user 302 and/or a merchant has attributes stored with payment provider server 370, such as website addresses and information about the website, such as color schemes, payment option locations, etc. These attributes may be obtained from the user and/or merchant directly or through web scraping or other means. In various implementations, one or more attributes may be passed to payment provider server 370 as part of the process for creating an online display, and the attributes may be used by payment server 370 to obtain additional information for the display through various sources, such as during a web scraping.

Figure 4:
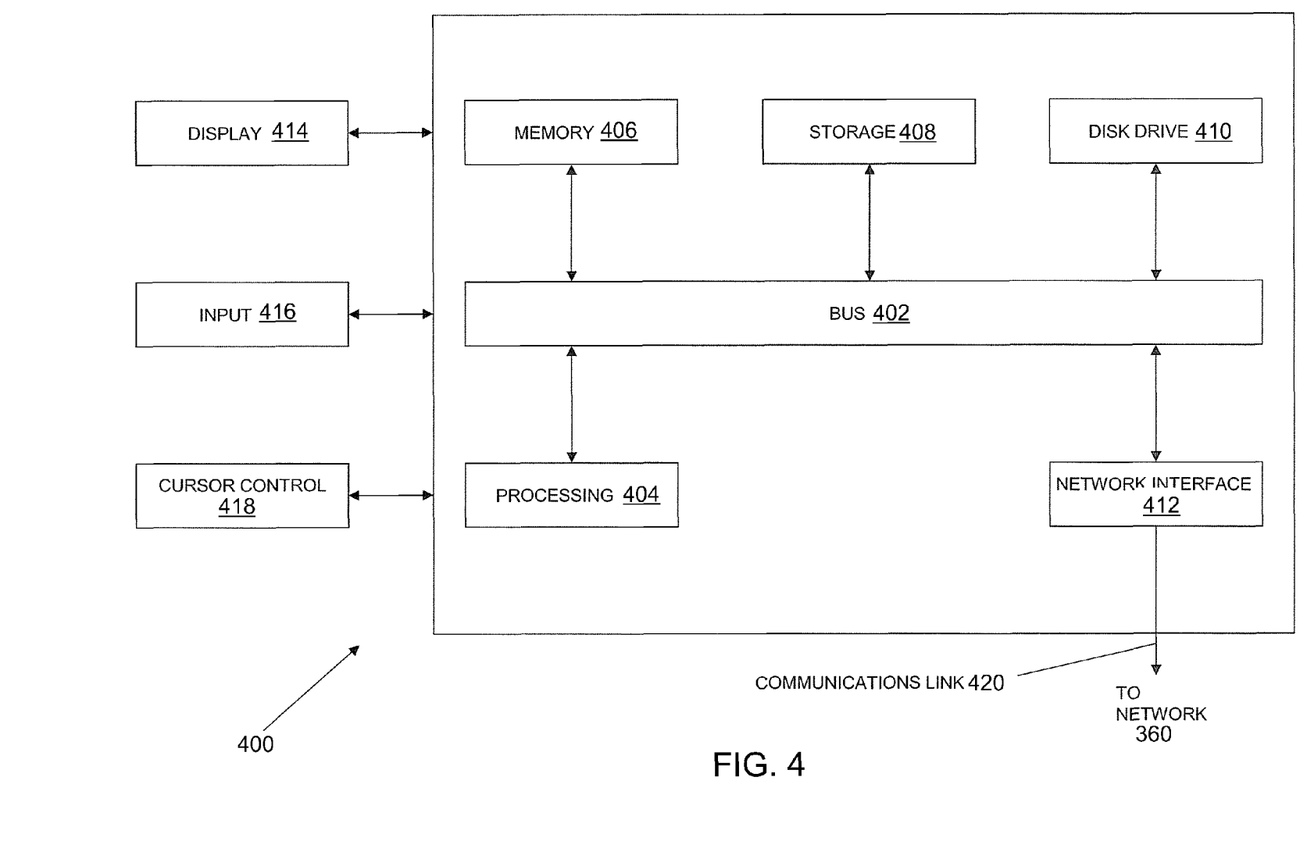
FIG. 4 is a block diagram of a computer system suitable for implementing one or more embodiments of the present disclosure.

FIG. 4 is a block diagram of a computer system 400 suitable for implementing one or more embodiments of the present disclosure. In various implementations, the user and/or merchant device may comprise a personal computing device (e.g., a personal computer, laptop, smart phone, PDA, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

In accordance with various embodiments of the present disclosure, computer system 400, such as a personal computer and/or a network server, includes a bus 402 or other communication mechanism for communicating information, which interconnects subsystems and components, such as a processing component 404 (e.g., processor, micro-controller, digital signal processor (DSP), etc.), a system memory component 406 (e.g., RAM), a static storage component 408 (e.g., ROM), a disk drive component 410 (e.g., magnetic or optical), a network interface component 412 (e.g., modem or Ethernet card), a display component 414 (e.g., CRT or LCD), an input component 416 (e.g., keyboard, keypad, or virtual keyboard), and a cursor control component 418 (e.g., mouse, pointer, or trackball). In one implementation, disk drive component 410 may comprise a database having one or more disk drive components.

In accordance with embodiments of the present disclosure, computer system 400 performs specific operations by processor 404 executing one or more sequences of instructions contained in system memory component 406, such as described above with respect to the consumer, merchant, and/or payment provider in FIGS. 1 and 2. Such instructions may be read into system memory component 406 from another computer readable medium, such as static storage component 408 or disk drive component 410. In other embodiments, hard-wired circuitry may be used in place of or in combination with software instructions to implement the present disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by a communication link 420 to the network (e.g., such as a LAN, WLAN, PTSN, and/or various other wired or wireless networks, including telecommunications, mobile, and cellular phone networks) may perform instruction sequences to practice the present disclosure in coordination with one another.

Computer system 400 may transmit and receive messages, data, information and instructions, including one or more programs (i.e., application code) through communication link 420 and a communication interface 412. Network interface component 412 may include an antenna, either separate or integrated, to enable transmission and reception via communication link 420. Received program code may be executed by processor 404 as received and/or stored in disk drive component 410 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above description is directed to creating online displays for payment options with logos. However, other types of displays can be created with different content and formats. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for creating an online display for a website, the method comprising:

determining a format for displaying logo images of funding sources on a merchant website;
presenting, by a processor of a service provider, a plurality of selectable logo images of the funding sources;
receiving selected ones of the logo images of the funding sources from a user, wherein, when a logo image of a funding source is selected, presenting the user with information about the funding source comprising countries where the funding source is accepted, a percentage of users having or using the funding source in each country, and usage information of the funding source for purchases made with a merchant;
presenting to the user selectable color options for the selected logo images of the funding sources;
receiving a selected background color option from the user;
receiving a URL address of the merchant website to which the selected logo images of the funding sources are to be added and previewed,
presenting the user with a preview of the merchant website overlaid with the selected logo images of the funding sources, wherein the preview of the merchant website comprises a section of the selected logo images of the funding sources which is movable within the merchant website for the user to designate a position of the section of the selected logo images within the merchant website; and
presenting the user with HyperText Markup Language (HTML) codes for displaying the selected logo images of the funding sources on the merchant website.

2. The method of claim 1, further comprising receiving a selection of a type of format for displaying the selected logo images of the funding sources from the user.

3. The method of claim 1, wherein the preview of the merchant website comprises a color palette comprising a plurality of colors selectable by the user to designate a background color for the selected logo images of the funding sources.

4. The method of claim 1, wherein the selectable logo images of the funding sources are displayed a first area and the selected logo images of the funding sources are displayed in a second area, and wherein a logo image of a funding source is selected by moving the logo image from the first area to the second area.

5. The method of claim 1, wherein the format is determined from a screen scrape of the merchant website.

6. The method of claim 1, wherein the format comprises specific size, location, and colors of the logo images of the selected funding sources to be displayed on the merchant website.

7. A system for facilitating information transactions over a network, the system comprising:

a first component comprising a communication device adapted to communicate with a user via a first device over the network; and
a second component comprising a hardware processor adapted to
determine a format for displaying logo images of funding sources on a merchant website,
provide the first device with a plurality of selectable logo images of the funding sources,
receive selected ones of the logo images of the funding sources, wherein, when a logo image of a funding source is selected, the second component is further adapted to provide the first device with information about the funding source comprising countries where the funding source is accepted, a percentage of users having or using the funding source in each country, and usage information of the funding source for purchases made with a merchant, provide the first device with selectable color options for the selected logo images of the funding sources, receive a selected color option, receive a URL address of the merchant website to which the selected logo images of the funding sources are to be added and previewed, provide a preview of the merchant website overlaid with the selected logo images of the funding sources at the first device, wherein the preview of the merchant website comprises a section of the selected logo images of the funding sources which is movable within the merchant website for the user to designate a position of the section of the selected logo images within the merchant website, and provide the first device with Hyper Text Markup Language (HTML) codes for displaying the selected logo images of the funding sources on the merchant website.

8. The system of claim 7, wherein the preview of the merchant website comprises a color palette comprising a plurality of colors selectable by the user to designate a background color for the selected logo images of the funding sources.

9. The system of claim 7, wherein the selectable logo images of the funding sources are displayed in a first area and the selected logo images of the funding sources are displayed in a second area, and wherein a logo image of a funding source is selected by moving the logo image from the first area to the second area.

10. The system of claim 7, wherein the format is determined from a screen scrape of the merchant website.

11. The system of claim 7, wherein the format comprises specific size, location, and colors of the logo images of the selected funding sources to be displayed on the merchant website.

12. A non-transitory computer readable medium comprising a plurality of machine-readable instructions which when executed by one or more processors of a server are adapted to cause the server to perform a method comprising:

determining a format for displaying logo images of funding sources on a merchant website;

presenting a plurality of selectable logo images of the funding sources;

receiving selected ones of the logo images of the funding sources from a user, wherein, when a logo image of a funding source is selected, presenting the user with information about the funding source comprising countries where the funding source is accepted, a percentage of users having or using the funding source in each country, and usage information of the funding source for purchases made with a merchant;

presenting to the user selectable color options for the selected logo images of the funding sources;

receiving a selected color option from the user;

receiving a URL address of the merchant website to which the selected logo images of the funding sources are to be added and previewed, presenting the user with a preview of the merchant website overlaid with the selected logo images of the funding sources, wherein the preview of the merchant website comprises a section of the selected logo images of the funding sources which is movable within the merchant website for the user to designate a position of the section of the selected logo images within the merchant website; and presenting the user with HyperText Markup Language (HTML) codes for displaying the selected logo images of the funding sources on the merchant website.

13. The non-transitory computer-readable medium of claim 12, wherein the format is determined from a screen scrape of the merchant website.

14. The non-transitory computer-readable medium of claim 12, wherein the format comprises specific size, location, and colors of the logo images of the funding sources to be displayed on the merchant website.

* * * * *